US005714028A

United States Patent [19]

Horai et al.

[11] Patent Number: 5,714,028

[45] Date of Patent: Feb. 3, 1998

[54] LABELING METHOD AND LABELING APPARATUS

[75] Inventors: Mitsuru Horai; Masayuki Kubota, both of Minami-Ashigara, Japan

[73] Assignee: Fuji Photo Film Co., Ltd., Kanagawa, Japan

[21] Appl. No.: 620,345

[22] Filed: Mar. 22, 1996

[30] Foreign Application Priority Data

Mar. 27, 1995 [JP] Japan .................................... 7-067947

[51] Int. Cl.$^6$ .................................................. B32B 31/00

[52] U.S. Cl. ......................... 156/212; 156/483; 156/485; 156/361; 156/542

[58] Field of Search .................................... 156/542, 483, 156/484, 485, 475, 556, 361, 212, 213, 215

[56] References Cited

U.S. PATENT DOCUMENTS

| | | | |
|---|---|---|---|
| 4,867,833 | 9/1989 | McCoy | 156/542 X |
| 4,869,775 | 9/1989 | Quittner | 156/542 |

FOREIGN PATENT DOCUMENTS

| | | |
|---|---|---|
| A1-0203405 | 3/1986 | European Pat. Off. . |
| 1923994 | 2/1971 | Germany . |
| 2-166038 | 6/1990 | Japan . |
| 5-72671 | 3/1993 | Japan . |
| 5-204093 | 8/1993 | Japan . |

*Primary Examiner*—James Engel

*Attorney, Agent, or Firm*—Sughrue, Mion, Zinn, Macpeak & Seas, PLLC

[57] ABSTRACT

A labeling method and apparatus for putting a label onto a periphery of a photo film cassette, while conveying the photo film cassette from a label applying position to a label securing position while supporting the photo film cassette in a posture. In a label applying unit, a label is partly peeled from a label tape by turning the label tape around a separator member. While the peeled end portion of the label is hanging down from the separator member, the photo film cassette is moved toward the end portion of the label to stick the end portion to a forward portion of the periphery of the photo film cassette. As the photo film cassette is moved further toward a label securing unit, the label is completely peeled off. The label securing unit presses and rolls a pressing roller on the label along the periphery of the cassette to securely stick the label to the periphery.

9 Claims, 6 Drawing Sheets

LABELING METHOD AND LABELING APPARATUS

BACKGROUND OF THE INVENTION

1. Field of the Invention

The present invention relates to a labeling method and a labeling apparatus for labeling photo film cassette, and more particularly a labeling method and a labeling apparatus which stick a label onto a periphery of a photo film cassette having curved and flat peripheral surfaces in combination.

2. Background Art

JPA-2-166038 discloses a labeling apparatus wherein containers to be labeled are conveyed on a conveyer belt horizontally at regular spacings. A photoelectric switch is disposed in the course of the conveyer such that the photoelectric switch is turned on each time an optical path of the photoelectric switch is interrupted by the container. Upon the switch being turned on, a label is applied down to the container and, at the same time, a pressing roller moves down to press the label onto the container for a given time. Thus, the label is securely put on an upper portion of the container.

Meanwhile, a resin photo film cassette has been developed recently. As disclosed, for example, in JPA-5-72671, the resin photo film cassette has a cassette shell which contains a spool rotatable therein about which a roll of photo film is coiled, and a leader of the photo film may be advanced out of the cassette shell through a film port by rotating the spool in a film advancing direction. The cassette shell is constituted of a pair of resin molded parts. For the leader advancing function, ridges for preventing loosening of the film roll and a film separation claw for separating the leader from the roll to guide the leader toward the film port are formed on inner periphery of the cassette shell. Although the resin photo film cassette disclosed in this publication is substantially cylindrical, there are also those resin photo film cassettes which have a specific peripheral contour consisting of a combination of curved and flat surfaces.

Since the above-described labeling apparatus is directed to labeling only flat top containers, it would be necessary, for sticking a label around a peripheral surface of such a specific contour by use of the conventional labeling apparatus, to change the orientation of the cassette or container several times. Therefore, the conventional labeling apparatus could not label the new type photo film cassette having the specific peripheral contour at a high speed.

The present applicant has suggested a cassette labeling apparatus for the new type resin photo film cassettes, which is constituted of four units arranged in series. Each photo film cassette is put on a specific pallet designed to support the cassette with its film port oriented downward. Those pallets supporting the cassettes are successively conveyed on a belt conveyer to feed the photo film cassettes sequentially to the four units.

The first or most upstream unit applies a label to each cassette to stick an end portion of the label to a forward portion of the cassette. The second unit presses the label onto a top portion of the cassette. The third unit presses the label onto a rearward portion of the cassette. The fourth unit presses the other end portion of the label onto a bottom portion of the cassette on the pallet, that is, an R-shaped portion proximate the film port.

According to this cassette labeling apparatus, the photo film cassette is fixed in the same posture or position on the pallet throughout the labeling process, so that the labeling can be speeded up compared with the case where the posture of the cassette is to be changed during labeling.

However, as being constituted of four units, the cassette labeling apparatus is complicated as the whole, and hence disadvantageous in terms of maintenance and cost.

OBJECT OF THE INVENTION

In view of the foregoing, an object of the present invention is to provide a labeling method and a labeling apparatus which achieve with a simple construction a high speed labeling and a high productivity of photo film cassettes having a specific peripheral contour, and thus contribute to cutting the mechanism cost and maintenance cost.

SUMMARY OF THE INVENTION

To achieve the above and other objects and advantages, a labeling method of the present invention for sticking a label onto a periphery of a photo film cassette having curved and flat peripheral surfaces in combination is constituted of a label applying process and a label securing process. The label applying process includes the steps of conveying the photo film cassettes in a posture with its film port oriented downward; feeding a continuous label tape to turn it around an acute edge of a separator member by a given amount to peel an end portion of a label from the label tape; stopping the label tape in a position where the end portion of the label hangs down from the separator member into a path of the photo film cassettes being conveyed; sticking the end portion of the label to a forward portion of the periphery of the photo film cassette as being conveyed in a forward direction along the path; and thereafter restarting feeding the label tape by the given amount.

The label securing process includes the steps of stopping conveying the photo film cassette; and rolling a pressing roller around the periphery of the photo film cassette to press the label onto the periphery.

A labeling apparatus of the present invention for sticking a label onto a periphery of a photo film cassette having curved and flat peripheral surfaces in combination is constituted of a conveyer for conveying the photo film cassettes along a substantially horizontal path, with a film port of each photo film cassette oriented downward, a label applying unit, and a label securing unit disposed behind the label applying unit in a forward direction of the conveyer.

The label applying unit comprises a separator member having an acute edge which is directed perpendicularly toward the path of the photo film cassettes; a tape feeder for feeding a continuous label tape intermittently by a given amount while turning the label tape around the acute edge of the separator member so as to peel an end portion of a label from the label tape, and stop the label tape in a position where the end portion of the label hangs down from the separator member into the path of the photo film cassettes; and a sticking device for sticking the end portion of the label to a forward portion of the periphery of the photo film cassette as being conveyed in a forward direction along the path.

The label securing unit comprises an up-down device for moving a pressing roller up and down each time the photo film cassette stops at a position under the label securing unit; and a device for moving the pressing roller backward and forward along the path of the photo film cassette. Thus, the label securing unit rolls the pressing roller around the periphery of the stopping photo film cassette to press the label onto the periphery.

In this way, each photo film cassette is labeled in two processes without the need for changing the posture, so that high speed labeling can be achieved at a low cost. The present invention simplifies the construction of the labeling apparatus, and cuts the cost of the mechanism, as well as facilitates the maintenance.

The labels can deviate from a proper position on the label tape. If the deviating label should be put to the photo film cassette, the label would be displaced from the proper label sticking area of the photo film cassette. According to a preferred embodiment, the label applying unit further comprises a sensor device for detecting a deviation of a label in the lateral direction thereof, and a controller for correcting the lateral position of the label tape in accordance with the deviation of the label, so as to apply the label always in a proper position on the photo film cassette.

Another problem is that the label tends to be electrostatically charged at the edge of the separator member when being peeled. The electrostatically charged label is attracted or adhered to the photo film cassette before the cassette reaches a proper label applying position. As a result, the label may be improperly positioned on the photo film cassette. According to another preferred embodiment, a destaticizer is disposed on one side of the label apply unit, so as continuously to blow antistatic ionic air toward the peeled end portion of the label.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
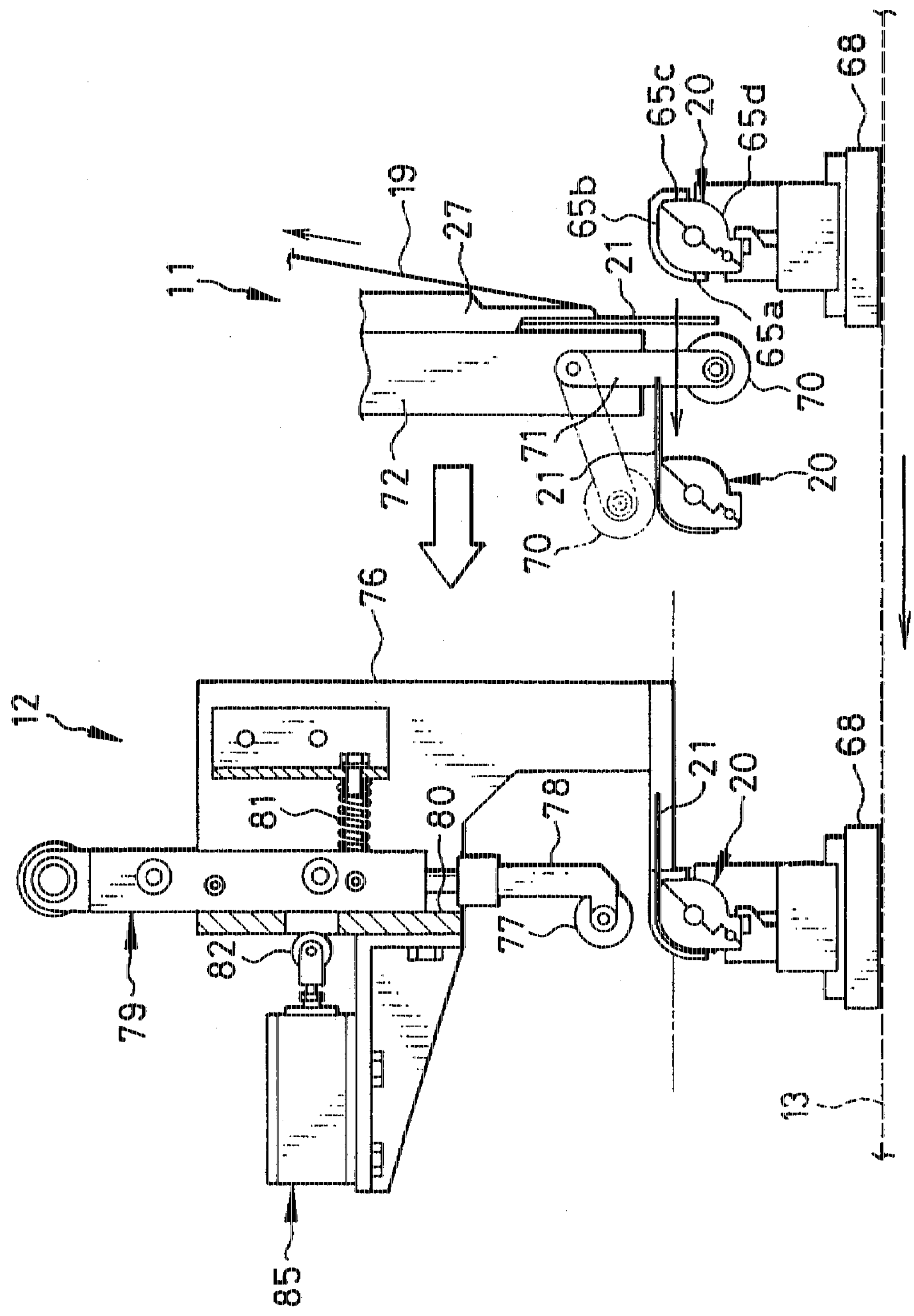
FIG. 1 is an explanatory view in elevation, illustrating a labeling apparatus according to a preferred embodiment of the invention.

FIG. 1 shows a labeling apparatus according to an embodiment of the invention, which is constituted of a label apply unit 11 and a label securing unit 12 which are connected through a belt conveyer 13 for successively conveying photo film cassettes 20.

Figure 2:
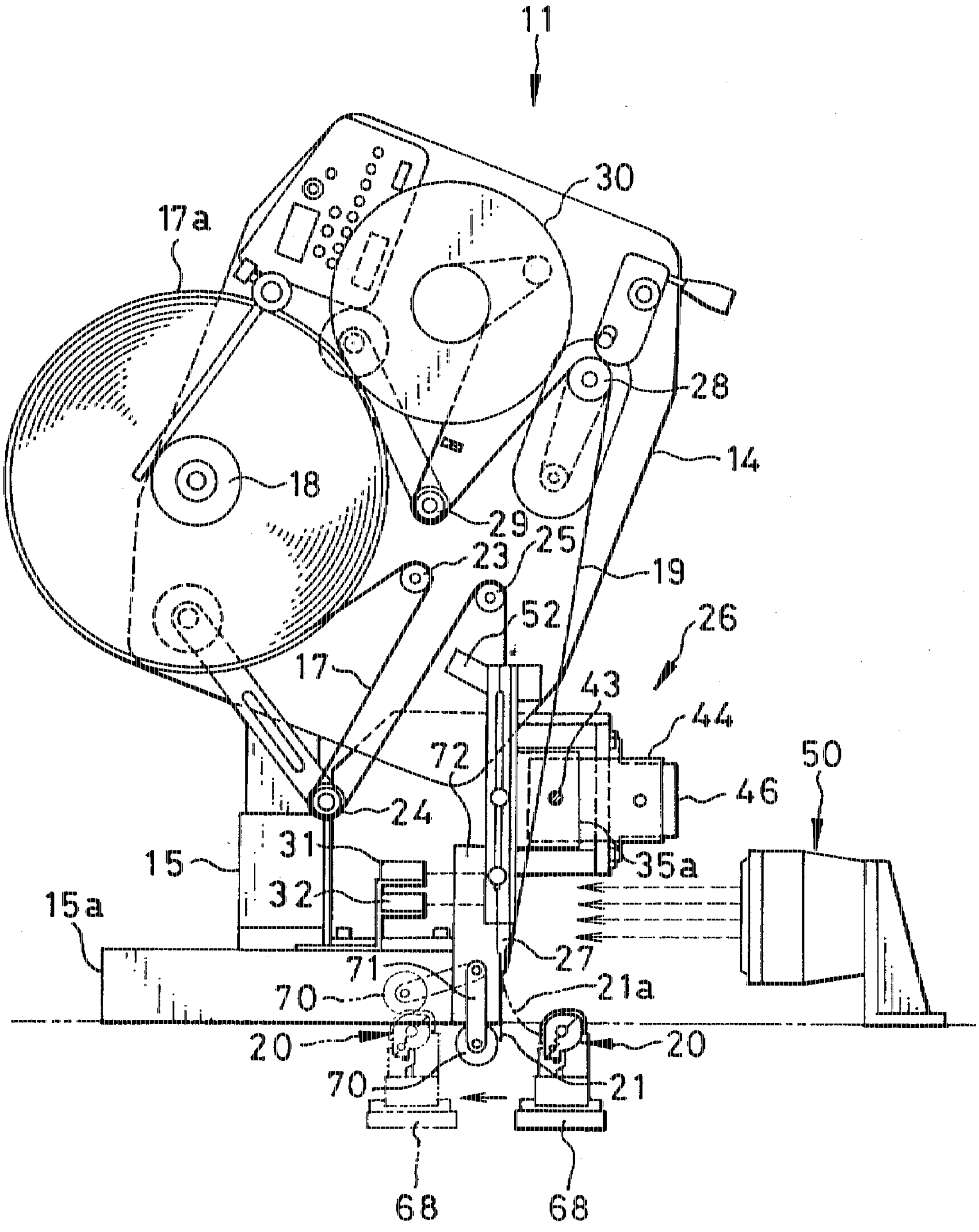
FIG. 2 is an explanatory view in elevation, illustrating a label apply unit of the labeling apparatus of FIG. 1.
Figure 3:
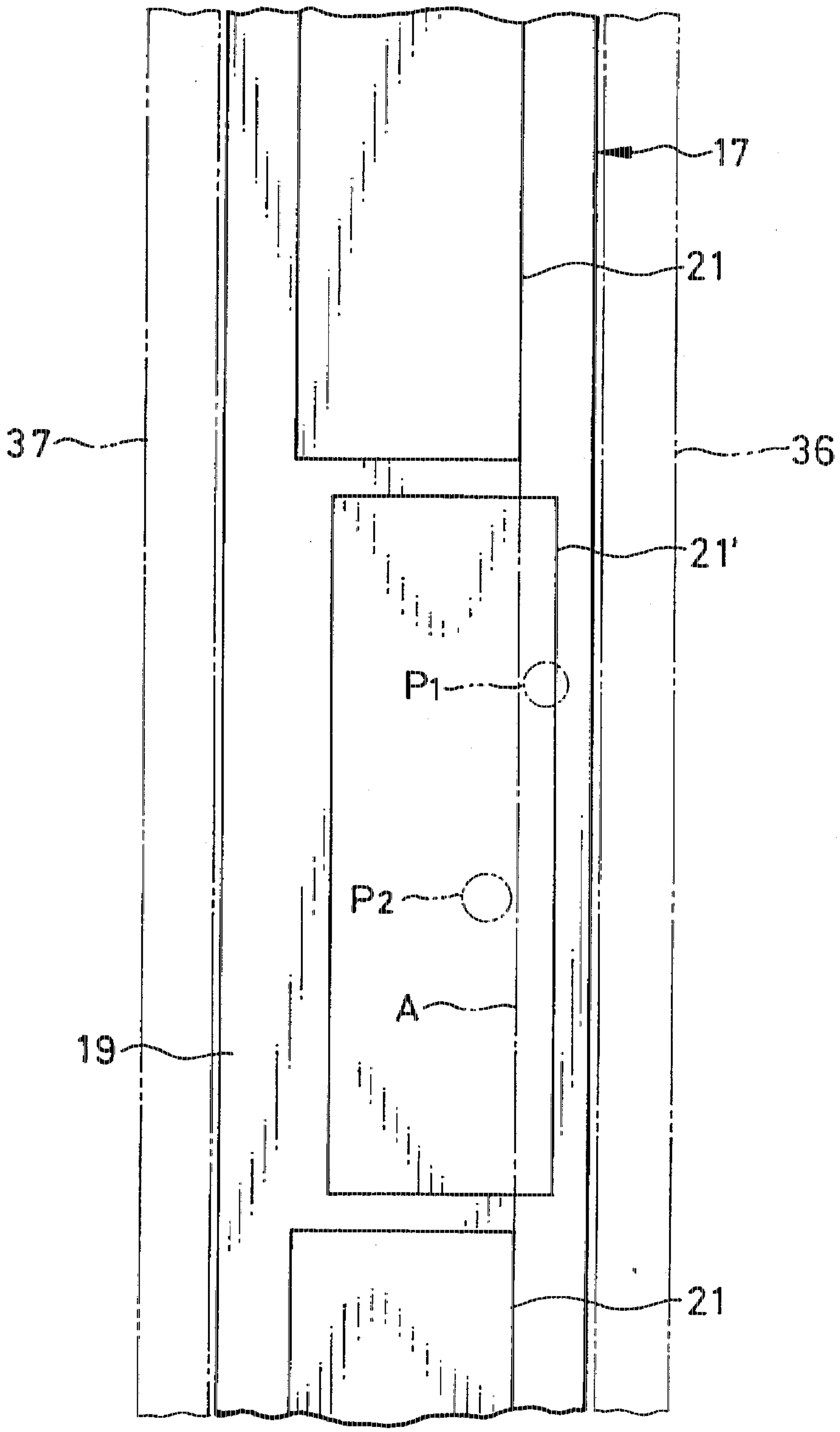
FIG. 3 is an explanatory plan view of a label tape for use in the label apply unit of FIG. 2.

As shown in detail in FIG. 2, the label apply unit 11 has a main body 14 supported on a support column 15. In the main body 14, a label tape 17 is supplied from a roll 17*a* which is wound on a winding shaft 18. As shown in FIG. 3, the label tape 17 is composed of a continuous strip of release paper 19 and a large number of adhesive labels 21 each cut in a size corresponding to a label sticking area on the periphery of the photo film cassette 20 in which each label is to stick. The labels 21 are serially and removably disposed on the release paper 19, with their adhesive layer inside.

The label tape 17 is guided through rollers 23, 24 and 25 toward a label position controller 26, which then turns the label tape 17 around a bottom edge of an separator member 27 such that the label 21 partly peels off the release paper 19. Then the label tape 17 temporarily stops in a position where an end portion of the label 21 hangs down from the bottom edge of the separator member 27. The photo film cassette 20 is fed to the label apply unit 11, such that the peeled end portion of the label 21 sticks to a leading side of the label sticking area of the photo film cassette 20 in the conveying direction. As the photo film cassette 20 moves with the label 21 stuck thereon, the label 21 is entirely removed from the release paper 19. Then, the label tape 17 restarts being fed, and the release paper 19 with no label 21 is guided through rollers 28 and 29 to be wound up onto a take-up reel 30. Thus, the label tape 17 is fed intermittently.

It is possible that some of the labels 21 on the label tape 17 deviate laterally from a normal position, as shown, for example, by a label 21' in FIG. 3, whose side edge is displaced from a proper edge line A. If the deviating label 21' should be applied to the photo film cassette 20 in the same way as the normally positioned labels 21, the label 21' would be displaced from the proper label sticking area, resulting in a disqualified photo film cassette 20. To solve this problem, two reflective photo-sensors 31 and 32 are disposed in face of the path of the label tape 17, to project Laser light beams toward the label tape 17 to detect the deviation of the labels 21, as shown in FIG. 2. The label position controller 26 corrects the course of the label tape 17 in the lateral direction in accordance with detection signals from the photo-sensors 31 and 32, so as to adjust the position of the label relative to the periphery of the photo film cassette 20.

Small circles P1 and P2 shown by phantom lines in FIG. 3 represent the detection points of the photo-sensors 31 and 32. If the label 21 is in the proper position on the label tape 17, the photo-sensor 31 detects the release paper 19, whereas the photo-sensor 32 detects the label 21. In case of the label 21' being displaced toward the circle P1, both of the sensors 31 and 32 would detect the label 21'. If the label 21 is displaced toward the circle P2, both of the sensors 31 and 32 would detect the release paper 19.

It is to be noted that the obverse surface of the label 21 having information printed thereon about the photo film contained in the photo film cassette 20, also has a surface reflectance largely different from that of the release paper 19, so that the output signals of the photo-sensors 31 and 32 detecting the label 21 are distinct from those detecting the release paper 19. Therefore, the label position controller 26 can determine based on the level change of the output signals the direction and amount of the course correction of the label tape 17. In this way, the deviation of the label 21 may be detected to an extent of 0.07 mm, in this embodiment.

Figure 4A:
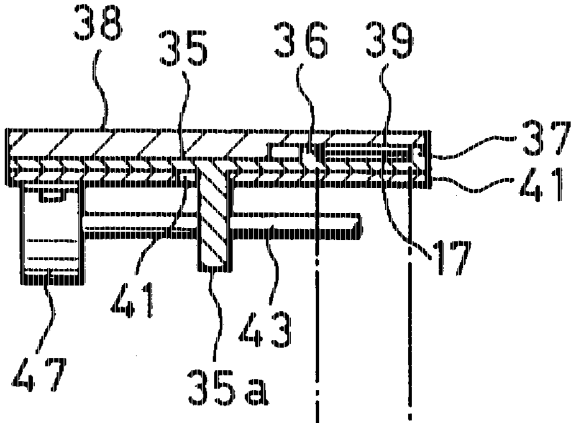
FIGS. 4A and 4B are explanatory views illustrating a label position controller of the label apply unit of FIG. 2, in horizontal section, and that viewed from right side of FIG. 2, respectively.
Figure 4B:
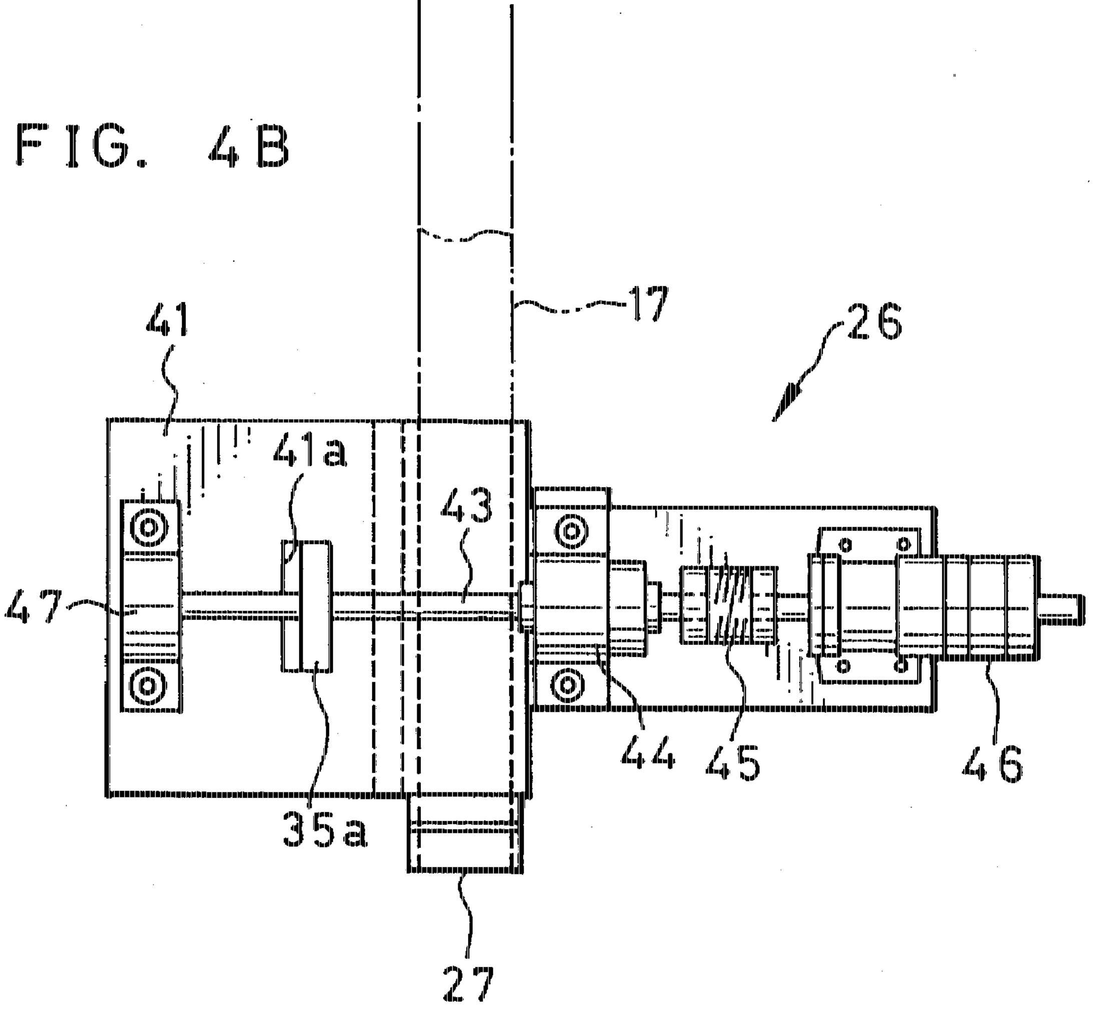

In the label position controller 26 as shown in FIGS. 4A and 4B, a tunnel 39 for passing the label tape 17 therethrough is formed between a pair of rails 36 and 37, which are formed integrally with a movable guide plate 35, on one hand, and a base plate 38 which is in contact with the rails 36 and 37 in a slidable fashion, on the other hand. The tunnel 39 leads to the separator member 27, as shown by phantom lines in FIGS. 4A and 4B. The guide plate 35 is slidable between the base plate and a cover plate 41 in the lateral direction of the label tape 17, so that the tunnel 39 may be shifted in the lateral direction. A projection 35*a* formed on the guide plate 35 protrudes out through a cut-out 41*a* of the cover plate 41. Through the projection 35*a* is inserted a ball screw or thread 43, which extends in the lateral direction of the label tape 17. One end of the ball screw 43 is coupled to a stepping motor 46 through a reduction gear 44 having a ratio of 1/100 and a joint 45. The other end of the ball screw 43 is supported by a bearing portion 47.

When the ball screw 43 is rotated by the stepping motor 46, the guide plate 35 is caused to slide through the projection 35*a*, to shift the position of the tunnel 39 in the lateral direction within a range defined by the width of the cut-out 41*a*. Since the tunnel 39 leads to the separator member 27, the course of the label tape 17 is corrected in the lateral direction responsive to the slide of the guide plate 35. The course correction is made to recover the normal signal conditions of the photo-sensors 31 and 32 where the detection signals of the photo-sensors 31 and 32 represent the release paper 19 and the label 21, respectively. According to the present embodiment, the label position controller 26 may have a maximum correction amount of 1.0 mm, a control accuracy of 0.1 mm, and a control speed of 0.1 mm/sec.

Another problem is that the label 21 tends to be electrostatically charged at the edge of the separator member 27 when being removed from the release paper 19. The electrostatically charged label 21*a* is attracted or adhered to the photo film cassette 20 before the cassette 20 reaches a proper label applying position, as is shown by phantom lines in FIG. 2. In result, the label 21*a* may be improperly positioned on the photo film cassette 20. To prevent this problem, a destaticizer 50 is disposed on one side of the label apply unit 11, so as continuously to blow antistatic ionic air toward the peeled end portion of the label 21 hanging down from the separator member 27. For example, the destaticizer 50 is disposed about 200 mm away from the peeled end portion of the label 21, and preferably in right opposition to the label surface. Thus, the accuracy of label sticking position is stabilized, so the label applying speed may be raised.

It was found that the accuracy of label sticking position depends also on the diameter of the winding shaft 18. That is, when the diameter of the winding shaft 18 is small, the labels 21 remain being curled after the removal from the release paper 19, so that the distance of the free end of the label 21 from the separator member 27 changes according to the degree of the curl. To prevent this problem, the winding shaft 18 of the present embodiment is set in 6 inch in diameter (actual external diameter is 165 mm), through an ordinary winding shaft is 3 inch in diameter (actual external diameter is 90 mm).

At an entrance for accepting the label tape 17, the label position controller 26 is provided with a brush brake 52 which gives an appropriate tension to the label tape 17 for stabilizing the end position of the free end of the partly peeled label 21. The tension to be given to the label tape 17 in case the diameter of the winding shaft is 3 inch, is twice as large as that necessary for the 6 inch winding shaft 18. That means that the brush brake 52 should have a spring force of about 5.0 kg for the 3 inch drum, while the spring force should be about 3.0 kg for the 6 inch drum 18. Too much tension can result in tearing of the label tape 17. In view of this, the 6 inch drum 18 is still preferable.

Figure 5:
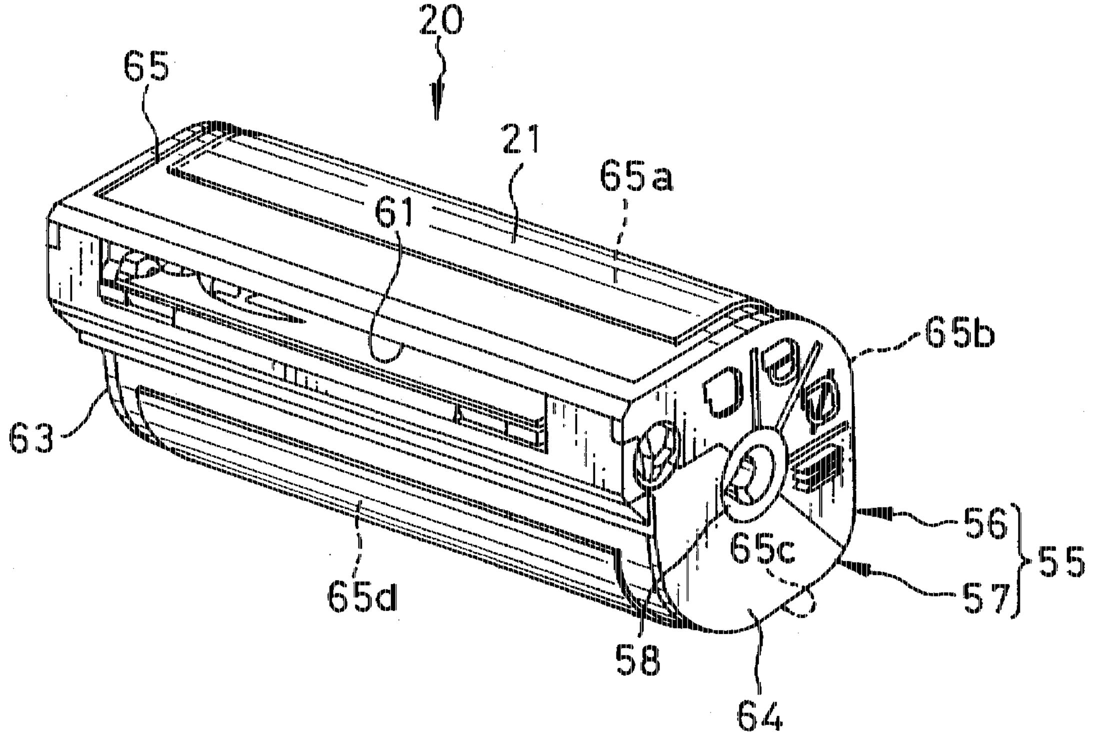
FIG. 5 is a perspective view of a labeled photo film cassette.

FIG. 5 shows an example of photo film cassette 20. A cassette shell 55 is constituted of a pair of resin molded mating parts 56 and 57, and supports a spool 58 to be rotatable therein, about which a roll of photo film is coiled. The periphery of the cassette shell 55 is formed as a combination of curved surfaces and flat surfaces. On the periphery of the cassette shell 55 is formed a shallow recess 65 whose depth corresponds to the thickness of the label 21. The label 21 is stuck on the bottom surface of the recess 65. The recess 65 covers neither a film port 61, which is formed in alignment with a joint between the resin molded parts 56 and 57, nor axial end portions of the periphery abutting to end faces 63 and 64 of the cassette shell 55. Applying the label 21 reinforces the cassette shell 55 so that the mating parts 56 and 57 may not separate even when the cassette shell 55 drops accidentally.

When setting the photo film cassette 20 in a pallet 68 which is conveyed on the belt conveyer 13, the film port 61 is oriented downward of the pallet 68 as shown in FIG. 1. Accordingly, the bottom surface of the groove 65 will be sectioned into a forward portion 65*a*, a top portion 65*b*, a rearward portion 65*c*, and a bottom portion 65*d* with respect to the orientation toward the label apply unit 11.

Behind the separator member 27 is disposed a pressing roller 70 made of an elastic material such as rubber or sponge. The pressing roller 70 is supported on a distal end of an arm 71 which is pivotally mounted on a side of a supporting portion 72 and is biased to rotate in a counterclockwise direction. The supporting portion 72 is disposed on a side of a base portion 15*a* of the support column 15.

When the photo film cassette 20 set on the pallet 68 comes to the label apply unit 11, the label 21 is nipped between the pressing roller 70 and the forward portion 65*a* of the photo film cassette 20, so that the label 21 is stuck to the forward portion 65*a*. As the photo film cassette 20 is further conveyed, the pressing roller 70 is rotated clockwise as indicated by phantom lines, while pressing the label 21 onto the forward to top portions 65*a* to 65*b* of the photo film cassette 20. Concurrently, the label 21 is entirely removed from the release paper 19. Thereafter, the take-up reel 30 is rotated to wind up the release paper 19 by a given length, thereby peeling the next label 21 partly off the release paper 19 at the portion turning around the separator member 27. The label tape 17 stops again with the peeled end portion of the next label 21 hanging down from the edge of the separator member 27, in the same way as shown in FIG. 1.

The label securing unit 12, which is disposed behind the pressing roller 70, has a support frame 76, an up-down device 79 pivotally supported on an upper portion of the support frame 76, an L-shaped arm 78 moved up and down by the up-down device 79, and a pressing roller 77 supported on a distal end of the L-shaped arm 78. The pressing roller 77 is similar to the pressing roller 70. The label securing unit 12 also has a stopper 80 disposed on the support frame 76 on a downstream side of the up-down device 79 with respect to the cassette conveying direction, a restoring spring 81 which urges the up-down device 79 to a home position in contact with the stopper 81, and a pushing device 85 having a roller 82 for pushing the up-down device 79 on the opposite side so as to move the up-down device 79 and thus the pressing arm 77 in a rearward direction opposite to the cassette conveying direction.

In order to clearly illustrate the sticking process of the label 21, the recess 65 of the periphery of the cassette shell 55 is omitted from the drawings of FIGS. 1 and 6A to 6D.

The labeling apparatus having the above construction operates as follows:

First, the winding shaft 18 with the roll 17*a* of label tape 17 is mounted to the main body 14 of the label apply unit 11. The label tape 17 is drawn from the winding shaft 18 to suspend it around the rollers 23 to 25, and guide it through the label position controller 26. The label tape 17 is then turned around the separator member 27 to secure the leading end of the label tape 17 to the take-up reel 30 through the rollers 28 and 29.

When a power is supplied to the label apply unit 11, the photo-sensors 31 and 32 output detection signals representative of a lateral position of the label 21 to the label position controller 26. If the lateral position of the label 21 deviates from its proper position, the stepping motor 46 is driven to move the guide plate 35 so as to correct the lateral position or course of the label tape 17 in accordance with the deviation of the label 21. After the correction, the label tape 17 is fed by the given amount until the given length of end portion of that label 21 is peeled off to hang down from the separator member 27.

The photo film cassettes 20 are assembled in an assembly line, and are conveyed to an initial station of the belt conveyer 13 of the labeling apparatus, through another belt conveyer or the like. In the initial station, the photo film cassettes 20 are seriatim put on the pallets 68 with the film ports 61 oriented downward, for example, by use of a mechanical hand or robot. The pallet 68 holds the photo film cassette 20 around the film port 61 and the end faces 63 and 64 so that the recess 65 on the periphery of the cassette shell 55 is entirely exposed to the outside. After the photo film cassette 20 is put on the pallet 68 in this way, the pallet 68 is conveyed on the belt conveyer 13 toward the label apply unit 11.

The label apply unit 11 is in a standby position where the end portion of the label 21 is hanging down from the separator member 27. Since the destaticizer 50 always blows antistatic ionic air toward the free end portion of the label 21, the free end portion of the label 21 is not attracted to the photo film cassette 20 being approached to the label 21. Therefore, the label sticking position is not fluctuated. After the forward portion 65*a* of the photo film cassette 20 comes into contact with the free end portion of the label 21, the free end portion of the label 21 is pushed by the photo film cassette 21 toward the pressing roller 70 behind the label 21, as the pallet 68 keeps being conveyed. Thus, the free end portion of the label 21 is stuck to the forward portion 65*a* of the photo film cassette 20.

As the photo film cassette 20 is being further conveyed, the pressing roller 70 rolls to press the end portion of the label 21 onto the forward portion 65*a* and, thereafter, is pushed by the forward portion 65*a* of the cassette shell 55 to rotate clockwise. Then, the pressing roller 70 rolls into a position for pressing the label 21 onto the top portion 65*b*. Meanwhile, the label 21 is completely peeled from the release paper 19.

Figure 6A:
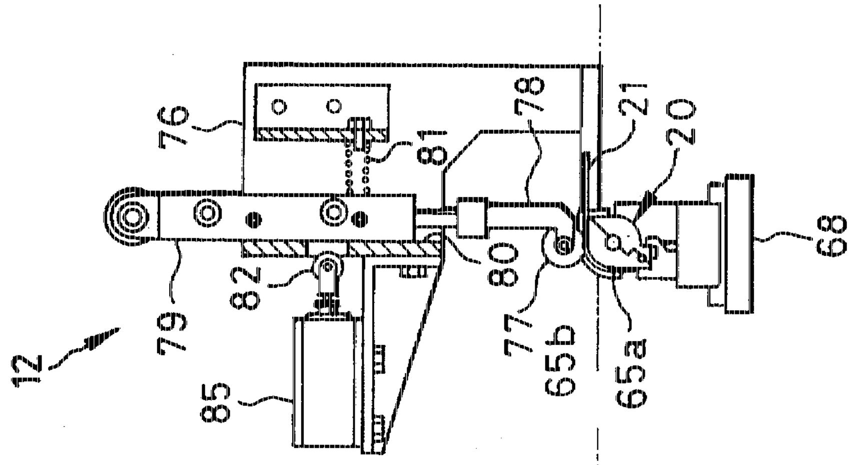
FIG. 6A, 6B, 6C and 6D are explanatory views illustrating the operation of a label securing unit of the labeling apparatus of FIG. 1.
Figure 6B:
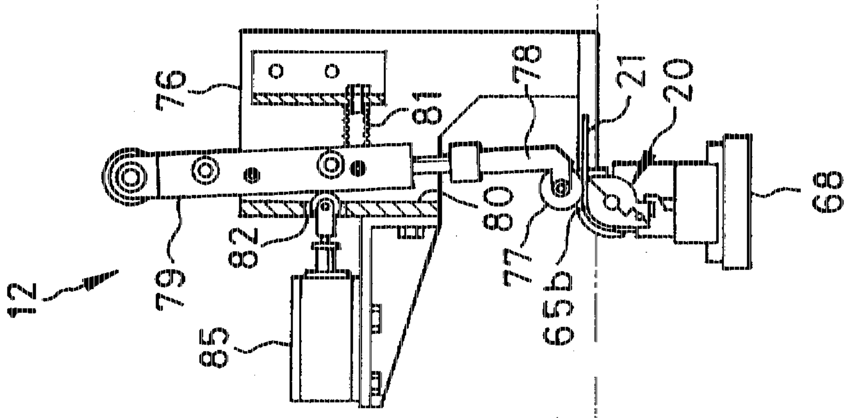

Thereafter when the photo film cassette 20 moves into a position under the label securing unit 12, the conveyer 13 stops, and the up-down device 79 is driven to move the L-shaped arm 78 down to cause the pressing roller 77 to press the label 21 onto the top portion 65*b* of the photo film cassette 20, as is shown in FIG. 6A. Next, the pressing device 85 is driven to move the up-down device 79 in the rearward direction against the urging force of the restoring spring 81, so that the pressing roller 77 rolls from end to end of the top portion 65*b* to press the label 21 thereon, as shown in FIG. 6B.

Figure 6C:
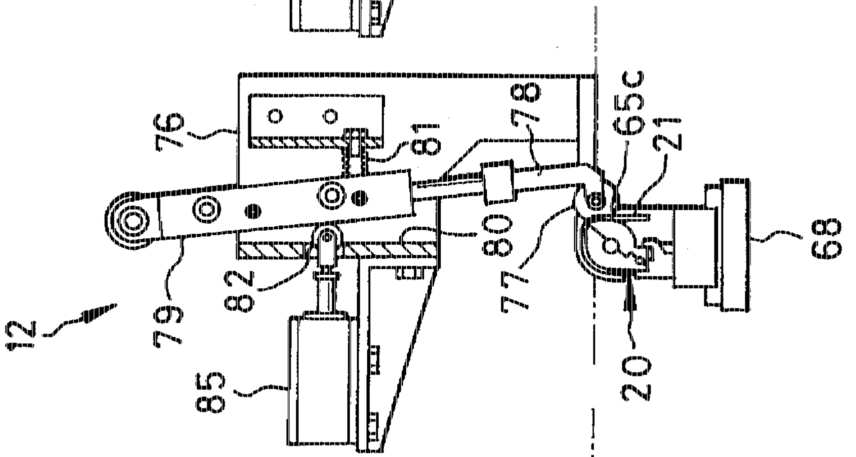
Figure 6D:
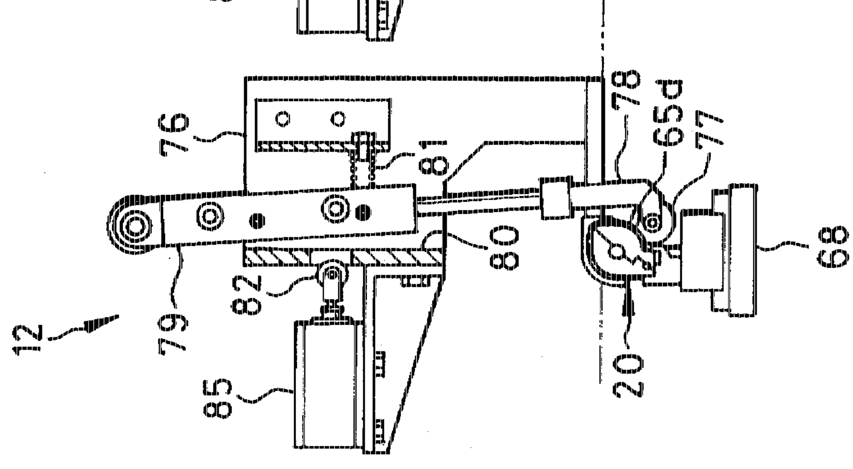

When the pressing roller 77 gets over the trailing end of the top portion 65*b*, the up-down device 79 is driven to move the L-shaped arm 78 down, and the roller 82 of the pressing device 85 is retracted from the up-down device 79. In result, because of the urging force of the restoring spring 81, the pressing roller 77 presses the label 21 onto the rearward portion 65*c* of the cassette shell 55 while the pressing roller 77 moves down along the rearward portion 65*c*, as is shown in FIG. 6C. The L-shaped arm 78 keeps being moved down to bring the pressing roller 77 to the bottom portion 65*d* of the cassette shell 55, so that the pressing roller 77 presses to stick a trailing end of the label 21 onto the bottom portion 65*d* according to the force of the restoring spring 81, as is shown in FIG. 6D.

Thereafter, the pressing roller 77 is moved up till the label securing unit 12 returns to the initial position shown in FIG. 6A, while the photo film cassette 20 restarts to be conveyed. The above described operation is repeated to stick the labels 21 to the photo film cassettes 20 in a successive fashion. The labeling apparatus according to the present embodiment can label the photo film cassettes 20 at a high speed of about 0.9 sec. per cassette.

The above described label tape 17 may have the following construction.

The label tape has a layered construction which is generally constituted of an adhesive layer, a base layer and a printed layer which are laminated on a release paper. The base layer of the label should preferably be plain and have high printability as well as high tensile and tearing strength. In case of the cassette shell being constituted of a pair of resin molded shell halves, the label is required to have an enough strength to prevent the shell halves from slipping or loosening because the label has a function to reinforce the joint between the shell halves. Accordingly, as the material of the base layer, coated paper, wood free paper, art paper and the like are preferable. Also, those resin films which are easy to stick and plain are applicable. For example, polystyrene (PS) film, transparent polyethylene (PE) film, polypropylene (PP) film, polyethylene terephthalate (PET) film, acrylic film, polycarbonate film, triacetate film, vinyl chloride film are applicable. In view of recycling, it is desirable to use the same material for the base layer as for the cassette shell.

The base layer may be non-stretched or oriented film, or uniaxially or biaxially oriented film. But in terms of heat resistance, uniaxially or biaxially oriented film is preferable. Most preferred examples are biaxially oriented polystyrene film and biaxially oriented polyethylene terephthalate film. Thickness of the base layer is 10–90 μm, preferably 20–80 μm, more preferably 30–70 μm, and most preferably 40–60 μm. Less than 10 μm thick base layer is insufficient in strength. More than 90 μm thick base layer is hard to form as stretched or oriented film.

To improve printability, the base layer may be provided with a white pigment porous layer or a matting agent layer on one surface thereof, which helps fixing of ink or printer toner. As commercially available material of the label, there are synthetic paper "Peach Coat" Series (produced by Nisshin Spinning Co.), Kainas Series (by Rintech Co.), S6065 Series and S8065 Series (by Dai Nippon Ink Co.) and Labeling Paper For Impact Printer (by New Oji Paper Co.), though the base layer should not be limited to these examples.

The adhesive layer may contain any of pressure-sensitive adhesive agents of rubber type, acrylic type, vinyl ether type, silicone type. In the stage of manufacturing and coating, the adhesive agents may be of solvent type, nonaqueous emulsion type, aqueous emulsion type, water-soluble type, hot-melt type, liquid-curing type, delayed tack type, and so forth. Examples of rubber type adhesive agents are described in New Polymer Library 13 "Adhesive Technic", p. 41 (1987), published by Polymer Publishing Association. As vinyl ether type adhesive agents, there are those which contain alkyl vinyl ether polymer having 2–4 carbon atoms as the main component, or those having vinyl chloride/vinyl acetate copolymer, vinyl acetate polymer, polyvinyl butylar or the like mixed with a plasticizer. As the silicone type adhesive agents, those which use rubber siloxane for the purpose of film forming and cohesive power of the layer, and resin siloxane as well for the purpose of adhesive power.

Especially for the photo film cassette, acrylic adhesive agents are preferable because they do not adversely affect the photographic properties of the photo film. The label has to satisfy several physical properties which are required after being applied to the cassette shell. Namely, the label on the cassette shell must not peel off, slip down, wave, shrink, tear or leak its paste (adhesive agent) out, even after many times of large temperature and humidity fluctuations that might occur where the photo film cassettes or the cameras are expected to be placed.

The adhesive agent of the adhesive layer is an acrylic adhesive agent composed of alkyl acrylate monomer of alkyl group having 4–12 carbon atoms in average, copolymerizable vinyl compound, and monoethylene-type unsaturated and polar copolymerizable monomer, loaded with tackifier according to the need. Copolymer containing acrylic ester as a main component satisfies the above requirements for use in the label, as being superior in chemical resistance, heat resistance, weathering resistance and oxidative degradation.

The acrylic adhesive agent may be produced in various ways. Any of polymerization methods, such as solution polymerization, emulsion polymerization, or ultraviolet or electron radiation polymerization which is executed concurrently with coating, is applicable. For ultraviolet polymerization, electromagnetic radiations having a wavelength range of about 180–460 nm are radiated by use of a mercury arc lamp, low—, middle—or high-pressure mercury lamp, ordinarily for 0.1–10 seconds or so. For ultraviolet curing, a photo-initiator such as benzoin, benzophenon is used in a range of 0.01–20 wt % in accordance with the need. The above electron radiations are radiations of accelerated nuclear particles that are projected from an electron accelerator in an appreciate dose, generally in a range of 0.01–100 Mrad.

As the alkyl acrylate monomer of alkyl group having 4–12 carbon atoms in average, there are n-butyl acrylate, isobutyl acrylate, hexyl acrylate, 2-hexyl acrylate, isooxyl acrylate, and so forth. To obtain fundamental physical properties necessary for the pressure-sensitive adhesive, loading of these alkyl acrylate monomer is preferably 69–99 wt %.

As the monoethylene-type unsaturated and polar copolymerizable monomer, there are monomers containing hydroxyl group, acid amid, epoxy group and the like as functional group, including acrylic acid, methacrylic acid, itaconic acid, anhydrous maleic acid, acrylic acid hydroxy propyl, acrylic acid 2-hydroxy ethyl, methacrylic acid 2-hydroxy ethyl, N-t-butyl acrylamide, diacetone acrylamide, glycidyl acrylate. These monomers, when copolymerized, help balancing self-adhesive properties, adhesive properties and cohesive power, as well as serve as crosslinking component. Less than 1 wt % of loading of the monoethylene-type unsaturated and polar copolymerizable monomers cannot sufficiently balance the above three properties. Loading of more than 20 wt % results in lowering self-adhesive and adhesive properties.

As the copolymerizable vinyl compound, there are acrylonitrile, methacrylonitrile, acrylic acid derivative and methacrylic acid derivative, vinyl acetate, maleic anhydride, styrene, propionic acid vinyl, maleic acid dibutyl, itaconic acid dibutyl and so forth. The copolymerizable vinyl compound is added to improve the cohesive power and the like, and may be added at most 30 wt %.

As the tackifier, which is loaded according the need, are used rosin or rosin-derivative resin (including modified-rosin resin), phenolic resin or alkylphenol group resin, petroleum resin, alkylphenol-acetylene resin, terpene-phenol group resin, terpene group resin, coumarone-indene resin, xylene resin, and so forth, whose softening point is 35° C. or more, preferably 40° C. or more, and most preferably 45° C. or more, in order to prevent lowering heat resistance. Preferred are rosin-derivative resin, phenolic resin, and xylene resin. Too much tackifier results in hardening the adhesive layer which lowers the initial tack. Accordingly, loading of the tackifier per 100 parts by weight of acrylic polymer is 1–40 parts, preferably 2–35 parts, and more preferably 3–30 parts by weight. In the range of less than 1 part by weight as well as more than 40 parts by weight, the tackifier cannot provide adhesive and self-adhesive properties.

Crosslinking is possible to improve heat resistance and cohesive power as well as to prevent leakage of the paste. As crosslinking method, there are those using polyfunctional isocyanate, melamine crosslinking method, those using glycidyl-acrylate and amine, those using internal crosslinking agents and so forth. Any of these methods is applicable if only it is directed to balancing adhesive—, self-adhesive and heat resistance properties. Loading of the crosslinking agent per 100 parts by weight of acrylic polymer is 0.1–10 parts, preferably 0.2–8 parts, and more preferably 0.5–6 parts by weight. In the range of less than 0.1 part by weight, the crosslinking agent has no effect on the properties, but increases the cost. In the range of more than 10 parts by weight, no extending effect is resulted, but the material cost is increased. Coating amount of the self-adhesive agent should be 10 $g/m^2$ or, in order to obtain sufficient adhesive properties. Since coating of above 40 $g/m^2$ self-adhesive agent tends to have bad effects, such as leakage of the paste, it is preferable to limit up to this range.

The release paper is silicone-coated paper. The paper for the release paper may be kraft paper, glassine, parchment paper, and the like. When using craft paper, polyethylene, PVA, CMC or the like is used as anchor coat. On the other hand, glassine and parchment paper, as being highly smooth and less permeable, may be directly coated with silicone.

Silicone has a skeleton of siloxane linked Si—O, wherein all or part of silicon atoms are linked with organic group (mainly methyl group phenyl group). For use in the release paper, silicone need to satisfy several conditions, that is, it should be superior in releasability, not transfer to the adhesive layer, hardly remove off the base paper. Accordingly, soft elastic coat having partly crosslinked linear polymeric siloxane is necessary, so that those products are mainly used which are produced by crosslinking straight-chain dimethylpolysiloxane terminated Si—OH with methylhydrogensiloxane through dehydration.

As silicone, there are solvent type, emulsion type, and nonsolvent type. In solvent type, the above silicone is diluted by five to ten times of organic solvent tolual, xylol, and normal hexane, and is mixed with necessary amounts of catalyst, anti-drop agent, acetic acid and so forth. The solvent type silicone is applied on the paper or plastic film by coating. As the catalyst is mainly used high fatty acid of lead or zinc salt.

The anti-drop agent is used for preventing the silicone from dropping off the base material when being scrubbed. As the anti-drop agent, an organic silicon compound containing amino group or alkoxy group is often used. Acetic acid is added to deactivates Si—H and elongate the pot life of the coating fluid. Also the emulsion type silicone is produced by diluting the above silicone by five to ten times of water, and loading necessary amounts of catalyst and acetic acid. The base material is then treated with the consequent coating fluid. On purpose to give tack to the coating fluid, and so forth, it is sometimes loaded with CMC or POVAL. The nonsolvent type silicone does not use these solvents, and uses platinum or the like as catalyst. The nonsolvent type silicone is hardened by heating at 180°–200° C. for 15 seconds or so.

The printed layer of the label is generally formed according to relief-printing, offset printing, screen printing and hot stamping. Among those, screen print and hot stamped print have greater thickness of ink, high weathering resistance, and well finished appearance of solid printed portions. But their production (printing) speed is low, and the cost is high, so that they are mainly applied to high grade niche printing product. On the other hand, offset printing is suitable for mass-production, because of its high production (printing) speed or productivity.

In case of printing on resin film such as polystyrene film, permeable ink is not applicable, but oxidation polymerized dry ink and ultraviolet curing ink are mainly used.

To both relief-printing and offset-printing, inks having the following compositions are applicable:

1. Oxidation polymerized dry ink composed of:
   1) binder drying oil: linseed oil, tung oil resin: rosin modified phenol, alkyd resin
   2) petroleum solvent
   3) pigment (carbon black)
   4) dryer (catalyst) as drying promoter fatty acid salt of cobalt, naphthenate, lead, borate of manganese, etc.
2. UV curing ink composed of:
   1) binder polymerization reaction resin (oligomer or prepolymer) acrylic acid ester, epoxy acrylate, urethane acrylate, polyester acrylate etc. photopolymerized monomer as reactive diluters (to improve tack and curing physical properties, and promote crosslinking) monoacrylate, diacrylate, triacrylate
   2) photopolymerization initiator or sensitizer benzophenone ether group benzophenone
   3) pigment (carbon black)
   4) assistant and additive agent: wax, filler etc.

The surface of the cassette shell to stick the label is preferably recessed by an amount corresponding to the thickness of the label so as more reliably to prevent peeling. The cassette shell in general has satin-finished matte external surfaces, and is loaded with silicone to minimize frictional wearing in rotational portions such as the spool. Since the cassette shell is substantially cylindrical, the label should be able to securely stick to the cylindrical or curved periphery. The type and coating amount of the adhesive agent, as well as the resiliency and thickness of the base material must be adapted to the shape of the cassette shell.

The label for the photo film cassette need to display various information about the photo film cassette, such as the type of photosensitive material, the film speed, the number of available exposures, instructions, precautions, identification number etc. which are expressed by letters, symbols, numerals, bar codes, or the like. The label need to have a blank for the user to write optional information.

The above function of the label is especially important for such a photo film cassette that is designed to contain its photo film even after development, as a film reservation case. The label can also indicate the inserting direction of the photo film cassette into the camera. The design and color of the print on the label should make the photo film cassette more attractive. To set off the color of the printed ink, the surface of the label before printing should preferably be plain, white and high reflective.

To print ID number on labels, it is necessary to change the number serially to each individual label of an enormous number. Therefore, a computer-controlled printer is usual for this purpose. The label must be adaptive to such a printer. Concretely, a Laser beam printer is utilized, so that the label need to have satin-finished surface suitable for fixing the toner of the Laser beam printer.

In the above described embodiment, the pressing roller 77 rolls around the periphery of the photo film cassette at one time, to press the label 21 onto the periphery of the photo film cassette 20. But it is possible to roll the pressing roller 77 more than one time by reciprocating the up-down movement of the L-shaped arm 78 as well as the back-and-forth movement of the pushing roller 82. To stop conveying the photo film cassette 20 at the label securing position below the pressing roller 77, any conventional detection device such as a photoelectric switch or micro-switch which is turned on responsive to contact with the pallet is applicable.

The labeling apparatus of the invention is adaptable to labeling containers of other contours than the photo film cassette 20 shown in FIG. 5, by modifying the operation or movement of the pressing rollers.

Thus, the present invention should not be limited to the above described embodiment but, on the contrary, various modifications may be possible to those skilled in the art without departing from the scope and spirit of the appended claims.

What is claimed is:

1. A labeling method for putting a label onto a periphery of a photo film cassette, said method comprising the steps of:

A. conveying the photo film cassette along a path in a forward direction from a label applying position to a label securing position while supporting the photo film cassette in a posture with a film port thereof oriented downward;

B. feeding a continuous label tape holding a plurality of labels removably thereon to a separator member having an acute edge, and turning the label tape around the acute edge so as to peel the label partly from the label tape;

C. stopping, after step B, the label tape in a position where a given length of end portion of the label is hanging down from the separator member into the label apply position on the path of the photo film cassette;

D. sticking, after step B, the end portion of the label to a forward portion of the periphery of the photo film cassette as being conveyed in the forward direction through the label apply position;

E. restarting steps B and C after step D;

F. stopping conveying the photo film cassette when the photo film cassette reaches the label securing position; and G. moving a pressing roller along the periphery of the photo film cassette to press the label onto the periphery.

2. A labeling method according to claim 1, wherein the periphery of the photo film cassette is constituted of curved and flat surfaces in combination.

3. A labeling apparatus for putting a label onto a periphery of a photo film cassette, said labeling apparatus comprising a conveyer for conveying the photo film cassette along a substantially horizontal path, while supporting the photo film cassette in a posture with a film port thereof oriented downward, a label applying unit, and a label securing unit disposed behind the label applying unit in a forward direction of the conveyer, wherein said label applying unit comprises a separator member having an acute edge which is directed perpendicularly toward the path of the photo film cassette; a tape feeder for intermittently feeding a continuous label tape holding a plurality of labels removably secured thereon to the separator member while turning the label tape around the acute edge, so as to peel the label partly from the label tape, and to stop the label tape in a position where a given length of end portion of the label is hanging down from the separator member into the path of the photo film cassette; and a sticking device for sticking the end portion of the label to a forward portion of the periphery of the photo film cassette as being conveyed in the forward direction along the path, and wherein said label securing unit comprises a pressing roller; an up-down device for moving the pressing roller up and down; and a device for moving the pressing roller back and forth along the path of the photo film cassette, said label securing unit moving the pressing roller along the periphery of the photo film cassette to press the label onto the periphery each time the photo film cassette stops below the label securing unit.

4. A labeling apparatus according to claim 3, wherein the periphery of the photo film cassette is constituted of curved and flat surfaces in combination.

5. A labeling apparatus according to claim 3, wherein the label tape holds the labels in a line along a longitudinal direction of the label tape, and said label applying unit further comprises a sensor device for detecting a deviation of the label in a lateral direction of the label tape; and a position controller for correcting the lateral position of the label tape in accordance with the deviation of the label so as to adjust a relative position of the label to the periphery of the photo film cassette.

6. A labeling apparatus according to claim 5, wherein said sensor device comprises a pair of reflective photo sensors projecting light beams toward two points on the label tape, said two points being disposed adjacent to and on opposite sides of a longitudinal line with which a side edge of each label should normally be aligned.

7. A labeling apparatus according to claim 3, wherein said label apply unit further comprises a destaticizer which is disposed to blow antistatic ionic air toward the end portion of the label that is hanging down from the separator member.

8. A labeling apparatus according to claim 3, wherein the label tape is fed from a winding shaft having a diameter of 6 inch or an actual external diameter of 165 mm.

9. A labeling apparatus according to claim 8, wherein said label apply unit further comprises a brush brake which gives an appropriate tension to the label tape for straighten the end portion of the label hanging down from the edge of the member.

* * * * *